United States Patent [19]
Chang et al.

[11] Patent Number: 5,764,223
[45] Date of Patent: Jun. 9, 1998

[54] TOUCH-SCREEN INPUT DEVICE USING THE MONITOR AS A LIGHT SOURCE OPERATING AT AN INTERMEDIATE FREQUENCY

[75] Inventors: Ifay F. Chang, Katonah; Chengjun Julian Chen, Yorktown Heights, both of N.Y.

[73] Assignee: International Business Machines Corporation, Armonk, N.Y.

[21] Appl. No.: 484,628

[22] Filed: Jun. 7, 1995

[51] Int. Cl.$^6$ .................................................. G09G 5/00
[52] U.S. Cl. ........................ 345/175; 341/26; 250/221
[58] Field of Search ........................ 345/173, 175, 345/176; 341/26, 31; 178/18, 19; 250/221, 229; 348/832, 834

[56] References Cited

U.S. PATENT DOCUMENTS

| | | | |
|---|---|---|---|
| 3,553,680 | 1/1971 | Cooreman | 341/31 |
| 4,144,449 | 3/1979 | Funk et al. | 250/221 |
| 4,459,476 | 7/1984 | Weissmueller et al. | 345/177 |
| 4,507,557 | 3/1985 | Tsikos | 250/221 |
| 4,517,559 | 5/1985 | Deitch et al. | 345/175 |
| 4,553,842 | 11/1985 | Griffin | 178/18 |
| 4,621,257 | 11/1986 | Brown | 341/5 |
| 4,692,809 | 9/1987 | Beining et al. | 345/175 |
| 4,703,316 | 10/1987 | Sherbeck | 345/175 |
| 4,710,760 | 12/1987 | Kasday | 345/175 |
| 4,766,424 | 8/1988 | Adler et al. | 345/175 |
| 4,782,328 | 11/1988 | Denlinger | 250/221 |
| 4,811,004 | 3/1989 | Person et al. | 345/175 |
| 4,820,050 | 4/1989 | Griffin | 341/31 |
| 4,980,547 | 12/1990 | Griffin | 341/31 |
| 4,986,662 | 1/1991 | Bures | 250/221 |
| 5,179,369 | 1/1993 | Person et al. | 345/175 |
| 5,196,835 | 3/1993 | Blue et al. | 345/175 |

FOREIGN PATENT DOCUMENTS

2206203  5/1988  United Kingdom .

OTHER PUBLICATIONS

Y. Lubino et al., "A Sensor Matrix for Display Screens", UK Patent Application GB 2082427A, Electronic Design Sep. 15, 1983 pp. 41–42.

I. Chang et al. "New Touch Input Technology for CRT Displays" SID International Symposium Digest, 1989, pp. 338–342.

IBM Technical Disclosure Bulletin, Versatile Input Device and Technology for CRT Terminal, vol. 33, No. 6A, Nov., 1990, pp. 296–298.

European Search Report, EP 94 11 4713, Jan. 3, 1995.

*Primary Examiner*—Richard Hjerpe
*Assistant Examiner*—Kara Farnandez Stoll
*Attorney, Agent, or Firm*—Whitham, Curtis, Whitham & McGinn; Louis J. Percello

[57] ABSTRACT

A CRT touch screen having raster-generated light patterns at the viewing screen borders of a conventional CRT. Reflective surfaces proximal to the screen borders reflect the light patterns across the CRT surface to external photodetectors. Modulating the horizontal blanking signal or employing periodic non-reflective patterns on the reflective surfaces effects raster-generated light patterns having a unique time frequency higher than the vertical synch frequency, but lower than the horizontal synch frequency. A screen pointer blocks the lights patterns reflecting across the screen to two or more of the photodetectors. The blocking is time-relative to the CRT's horizontal and vertical synch signals. The photodetector outputs are bandpass filtered at the unique pattern frequency to suppress electromagnetic interference from the CRT's horizontal raster synch, the CRT's vertical synch and other electromagnetic and optical sources. The screen pointer's position is calculated based on which photodetectors' received patterns are blocked, and the times of the blocking relative to the horizontal and vertical synch.

6 Claims, 12 Drawing Sheets

FIG. 10
WAVEFORMS

FIG. 11

REGION AB

REGION BD

REGION CD

REGION AC

FIG. 12

TOUCH-SCREEN INPUT DEVICE USING THE MONITOR AS A LIGHT SOURCE OPERATING AT AN INTERMEDIATE FREQUENCY

FIELD OF THE INVENTION

The present invention relates to a touchscreen input device for computers. More specifically, the invention relates to reflecting a CRT light pattern across the CRT surface to create signals used to determine the position of a pointer.

BACKGROUND OF THE INVENTION

Figure 1:
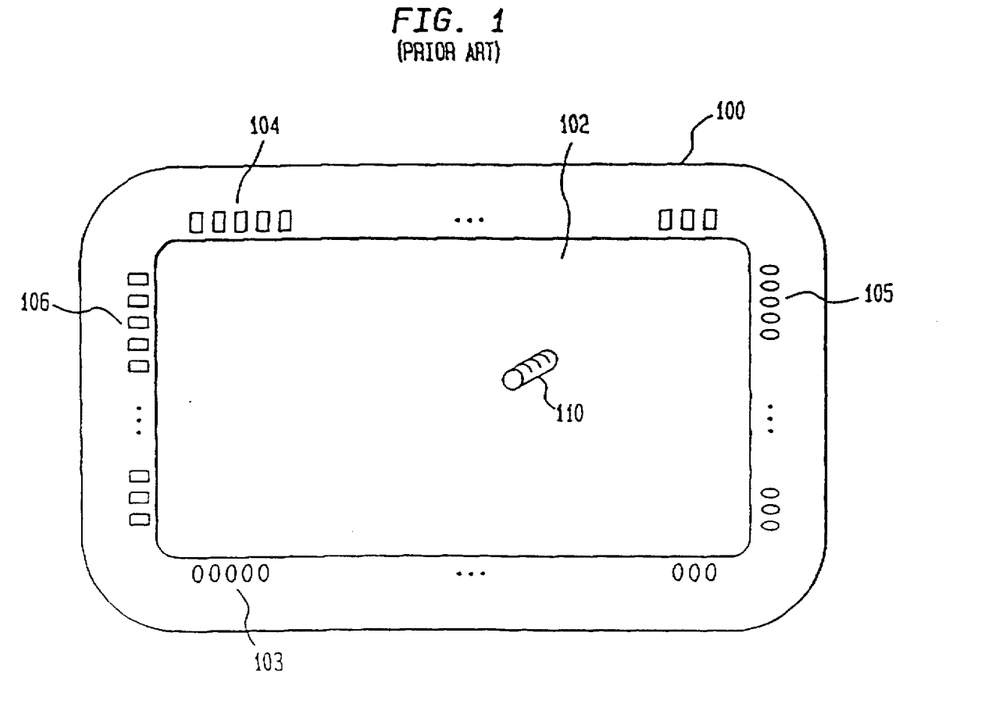
FIG. 1 is a drawing of a prior art optical-frame touchscreen device.

A Touchscreen is one of the most intuitive input devices for computers. It has been used extensively in public applications such as banks, kiosks, restaurants, ticket services, medical facilities, education, and places of recreation. Its application is steadily expanding. Many different methods have been used to realize a touchscreen input function. One of the oldest, and still the most widely used method, is the optical frame. It was described in U.S. Pat. No. 4,267,443 entitled "Photoelectric Input Apparatus", issued May 1981 to Carroll et al., as shown in FIG. 1, 100. It utilizes a plurality of light emitters (103 and 105) and a plurality of light sensors (104 and 106) to detect the position of the pointer 110 (finger or pencil). In a typical device, an array of 32 infrared light emitting diodes 103 is placed at the bottom of the screen, and an array of 32 light sensitive diodes 104 is placed at the top of the screen. A pointer 110 (finger or pencil) may block the light emitted from one emitter to one or two adjacent light detectors. Therefore, it provides 63 touch points in the horizontal direction. In addition, an array of 20 light emitting diodes 105 is placed at the left-hand side of the screen, and an array of 20 light detectors 106 is placed at the right-hand side of the screen. This makes 39 touch points in the vertical direction. On a 13-inch monitor 102, the resolution is 0.17 inch, or 4.4 millimeters. By lining up more photodiodes, the resolution can be improved. However, the manufacturing cost will be increased in proportion. Besides, there is a physical limit imposed by the size of photodiodes.

A number of alternative methods using visible or invisible light for touchscreen input have been proposed to improve the resolution and to reduce the manufacturing cost (mainly by reducing the number of light sources and light detectors), as documented in the following U.S. Patents. U.S. Pat. No. 4,459,476, entitled "Co-ordinate Detection System", issued Jul. 10, 1984 to Weissmueller et al, teaches to use the light emitted from two adjacent sides of the CRT as the light source, whereas on the two opposite sides, two arrays of light detectors are placed. By using radiation-emissive material excited by a flying spot of energy (an electron beam), the device can eliminate the two arrays of light-emission devices. However, the scanning frequencies for the vertical and horizontal directions are very different. Typically, the vertical scan frequency is between 50 to 90 Hz, and the horizontal scan frequency is 25 to 60 kHz. Therefore, at least one of the light sources has to be generated separately. Besides, as seen from the Figures in the patent, the construction of the CRT is quite different from the standard CRT, which requires a substantial additional manufacturing cost. These factors offset the benefit of eliminating the separate light-emitting devices. U.S. Pat. No. 4,507,557, entitled "Non-Contact x,y Digitizer Using Two Dynamic RAM Imagers", issued Mar. 26, 1985 to Tsikos, teaches the use of two light-emitting diodes, a set of mirrors, and two DRAM imagers for position detection. However, a DRAM imager together with its control electronics are more expensive than an array of photodiodes. U.S. Pat. No. 4,553,842, entitled "Two Dimensional Optical Position Indicating Apparatus" to Griffin, uses a rotating photodetector to replace the array of photodetectors. These mechanical devices can be slow, expensive, and prone to mechanical failures. U.S. Pat. No. 4,621,257, entitled "Video Display Touch Detection" to Brown describes a similar arrangement as in U.S. Pat. No. 4,459,476. Light is emitted from the top side and the left side of the CRT light source, whereas on the arrays of photodetectors are replaced by two CCD strips located at the back of the CRT. Since the cost of a CCD strip and the associated electronics is more expensive than that of an array of photodiodes, it does not show an advantage over the previous inventions. U.S. Pat. No. 4,703,316, entitled "Touch Panel Input Apparatus" to Sherbeck, uses four light sources, located at the four corners of the screen, and two arrays of photodetectors, placed on the opposite sides of the screen. This apparatus reduces the cost of the light sources, but the cost of the two arrays of light detectors is still present. U.S. Pat. No. 4,710,760, entitled "Photoelastic Touch-Sensitive Screen" to Kasday uses a transparent screen made of photoelastic material to deflect two beams of polarized light. The manufacturing cost of the photoelastic material will probably be higher than the Carroll system described in U.S. Pat. No. 4,267,443. U.S. Pat. No. 4,782,328, entitled "Ambient-Light-Responsive Touch Screen Data Input Method and System" to Denlinger, uses two CCD line-scan image sensors located at two adjacent corners of the monitor screen to detect the change of light pattern due to the presence of a pointer near the screen. Ambient light is utilized as light source. The CCD image sensors arc expensive, and the complication of discriminating the signal from the finger and the signal from the change of environmental conditions is at question. U.S. Pat. No. 4,811,004, entitled "Touch Panel System and Method for Using Same" to Person et al. uses two light sources and two light detectors for position detection. To make scanning light beams, two vibrating reeds with mirrors are used to reflect the light beams, thus to create two independent scanning light beams. A problem is that the behavior of the mechanical vibrators depends on the environmental conditions and is subject to wear. U.S. Pat. No. 4,820,050, entitled "Solid-State Optical Position Determining Apparatus" to Griffin, U.S. Pat. No. 4,980,547, entitled "Light Distribution and Detection Apparatus" and U.S. Pat. No. 5,196,835, entitled "Laser Touch Screen Reflective Surface Aberration Cancelling" to Blue et al., are variations of U.S. Pat. No. 4,553,842, which have the same problem with the mechanical motion parts.

Prior art exists that proposes using the light from the margins of the CRT monitor and four light detectors to make a touchscreen input device. Although the feasibility of the approach is demonstrated, enormous problems were encountered with regard to noise and interference. The signal from one edge of the monitor to the light detectors at the other edge of the screen is very small. The interferences come from three sources: the magnetic field of the horizontal scanning coil; the light from the active screen; and the the environmental light. In addition, the afterglow (slow decay) of the phosphor makes the signal variation (per horizontal line) much smaller. All those factors prevented the effective operation of this apparatus.

In spite of the numerous proposed improvements, currently the only touchscreen input device known to the inventors that viably uses light as a means of detection is still the oldest Carroll design. (The others use capacitance, resistance, surface acoustic wave, or strain gauges, all of which are more expensive compared to the optical frame.) The problem of improving the resolution as well as reducing the cost of optical touchscreen input devices remains unresolved.

OBJECTS OF THE INVENTION

It is an object of this invention to provide an improved touch screen input device.

It is an object of this invention to provide an improved touch screen input device that locates the position of a screen pointer quickly and accurately.

It is an object of this invention to provide an improved, inexpensive touch screen input device that uses little more than existing screen hardware and is not affected by the system noise generated by the raster scan.

SUMMARY OF THE INVENTION

These and other objects of the present invention are realized by providing a new kind of touchscreen input device which has a much better resolution but uses fewer components than the traditional optical frame. The present invention substantially improves the touch screen performance and reduces the manufacturing cost.

The present invention comprises a CRT monitor that has two strips of light patterns produced in the unused area of the CRT screen, typically at the right and left margins. In a preferred embodiment, the light patterns are created by a simple electronic circuit, whose output signal is coupled to the video amplifier of the CRT. The light patterns are created to have a unique pattern frequency, determined by the electronic circuit. The light pattern frequency is carefully selected to be easily discriminated, such that environmental disturbances and interference signals from within the CRT itself (such as the magnetic coil, and the light from the active screen area) can be effectively rejected. The light patterns in the margins of the CRT screen are deflected by reflective surfaces. The reflective surfaces are positioned in proximity to the strips of light patterns and reflect the light across the surface of the CRT. Four single photodetectors (detectors), preferably one located at each of the four corners of the CRT screen, are used to monitor the streams of reflected light. When a pointer (finger or pencil) is positioned on or near the surface of the CRT, the stream of light is blocked. The precise time of the blockage is detected by two or more of the sensors, which provide enough information to determine the pointer position.

BRIEF DESCRIPTION OF THE FIGURES

FIG. 13 depicts light reflectors having non-reflective horizontal grooves for generating a frequency of light patterns.

DETAILED DESCRIPTION OF THE INVENTION

The present invention is a novel modification of a CRT monitor of a computer that uses the light emitted from the CRT in a novel way as the source of signal to make the CRT a touchscreen input device. In other words, the invention inexpensively and effectively modifies the design of the CRT monitor to create a touchscreen input as an intrinsic function. The present invention can be made during the manufacturing process of the monitors with a small incremental manufacturing cost. In one preferred embodiment, the additional parts include a simple circuit (that can be a single chip or other means) to generate light patterns on the unused area of a CRT screen, a plastic reflector, four light detectors (e.g. silicon PIN photodiodes) with analog amplifiers, and a circuit for inputting the position signals into the computer.

Figure 2A:
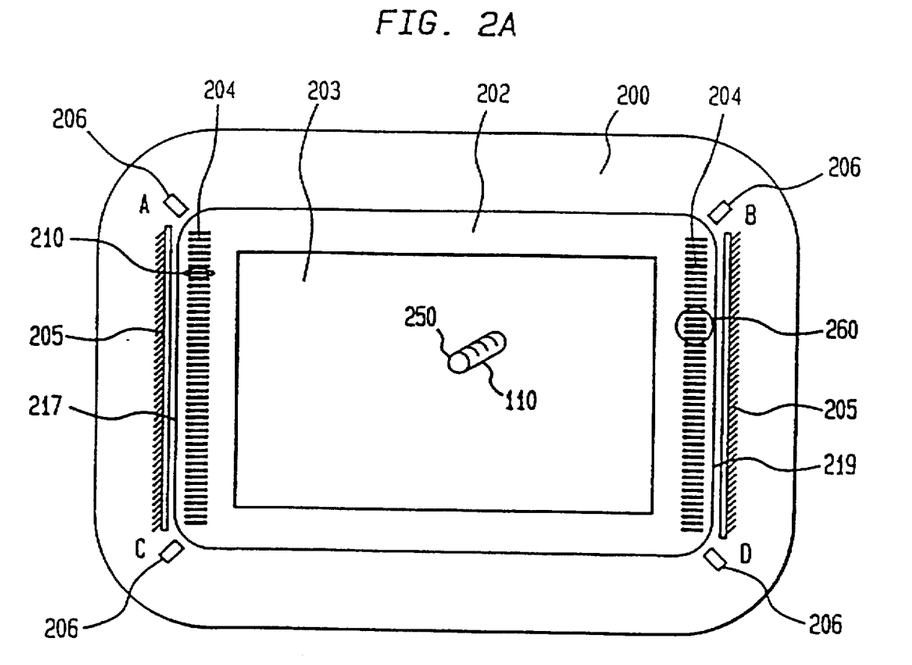
FIGS. 2A and 2B are a front and cross-section view, respectively, of the touchscreen input device of the present invention.
Figure 2B:
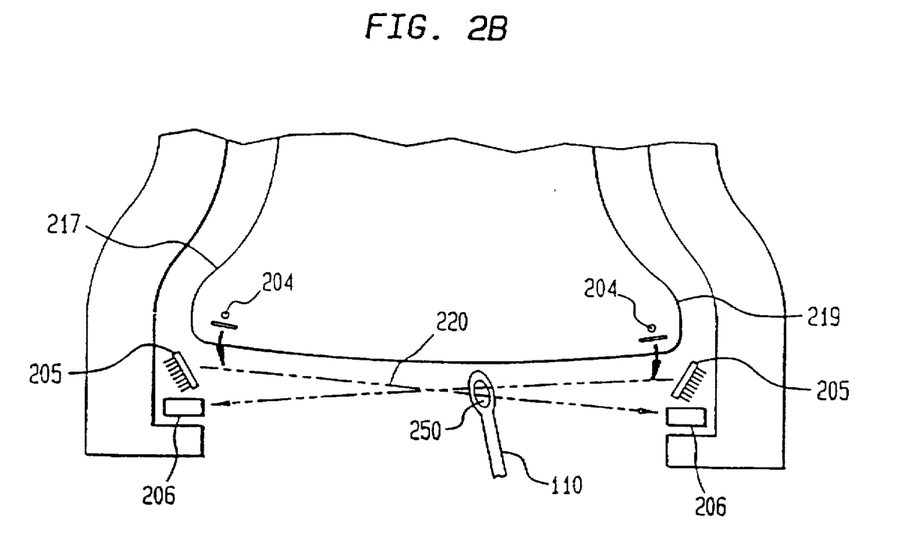

A depiction of one preferred embodiment of the new touchscreen input device is shown in FIGS. 2A and 2B. On the unused area of the CRT 202, preferably at the left margin 217 and the right margin 219, two rows of light patterns 204 are generated. The light is reflected by a pair of mirrors 205 to become parallel to the surface of the CRT. Four light detectors 206 are placed at the four corners of the CRT. When a pointer 110 is in the active area of the CRT 203, at least a part of the light of the light pattern 204 is blocked from the detector 206. Using the location of the light blockage with respect to two or more detectors and other information, the position of the pointer 110 can be determined.

A critical novel feature of this invention is the creation of a unique frequency (in time and space) of the light pattern. The light pattern frequency is chosen to be different from the frequencies of the noises (internal and external) found at the CRT so that the light pattern frequency and, therefore, information about the blockage of the light pattern at any given location can be effectively picked up, amplified, and transferred to the computer.

If the light pattern 204 frequency is near the horizontal or vertical scan frequencies, it is very difficult to detect the onset positions of light blockage. This is because there are large signal noises at the CRT with these frequencies. The environment light, which varies with the line frequency (50 Hz or 60 Hz), and its overtones, has a frequency close to the typical vertical scan frequency and is much stronger (hundreds or thousands of times) than the light from the CRT edge. Also, the light pattern 204 frequency 260 cannot be near the horizontal scan frequency for two reasons. First, the magnetic field of the horizontal scan is so strong that it will obscure the optical signal even with a sophisticated magnetic shield. Second, the phosphor used on CRTs has a finite decay time to avoid flickering. Therefore, the variation of the light intensity with time is much smaller than expected, which makes the light pattern frequency 260 more difficult to detect.

The present invention avoids these problems by creating the light pattern 204 with a frequency 260 in time and a frequency in space that is much higher than the frequency of the vertical scan and the line frequency, and much lower than the horizontal scan frequency. This light pattern 204 can be generated by using a circuit to create a video signal for generating lighted edge points 210 of the light pattern 204 (where the raster crosses the border 202 of the CRT) to occur in a predetermined spatial sequence and time frequency. Any number of these sequences, i.e. time and space frequencies 260 of the the light patterns 204, can be chosen to be at a much different rate than the horizontal and vertical scan frequencies (and other noise.) This video signal can be created either using hardware or using software to selectively light the bright edge points 210 of the light pattern 204. For example, for VGA monitors, the horizontal scanning frequency is 31.5 kHz. The light pattern sequences 204 can be chosen to appear as a group of m bright dashes (for illustration purpose, let m=1) every n (for example, n=2, 3, 4, 6, or 8) horizontal scans. The frequency of the light pattern 204, in relation to the raster frequency, is then

| Ratio n | Signal Frequency (kHz) | Spatial resolution (lines) |
|---|---|---|
| 2 | 15.75 | 480 |
| 3 | 11.8 | 320 |
| 4 | 7.88 | 240 |
| 6 | 5.9 | 160 |
| 8 | 3.94 | 120 |

As shown, these light pattern 204 frequencies 260 are indeed much higher than the vertical scan frequency and line frequency (71 Hz and 60 Hz respectively), and much lower than the horizontal scan frequency (in this case 31.5 kHz). Therefore, using a band-pass filter, the two sets of interfering signals can be rejected efficiently, and the signal of pointer blockage (which is carried on the light pattern 204 frequency 260) can be detected clearly. More than one light dash can be grouped to give greater light intensity. Also, by choosing different n, a desirable trade-off between stability and resolution can be achieved.

The light patterns 204 that are reflected across 220 the screen face 200, are detected by the detectors 206, preferably one of which is located in each of the screen 200 corners (A–D). Each of these detectors 206 generates a detector signal that is based on the light pattern 204 it detects. In a preferred embodiment, the lighted edge points 210 are bright dashes 210. In the presence of a pointer 110, some of the bright dashes of the light patterns 204 are blocked to at least two of the detectors. In this way, the blockage information, that is related to the position of the pointer 110 on the screen is carried by the light pattern frequency 260. The blockage information therefore, is also represented in the detector signals detecting a light pattern 204 with some blocked bright dashes.

Figure 3:
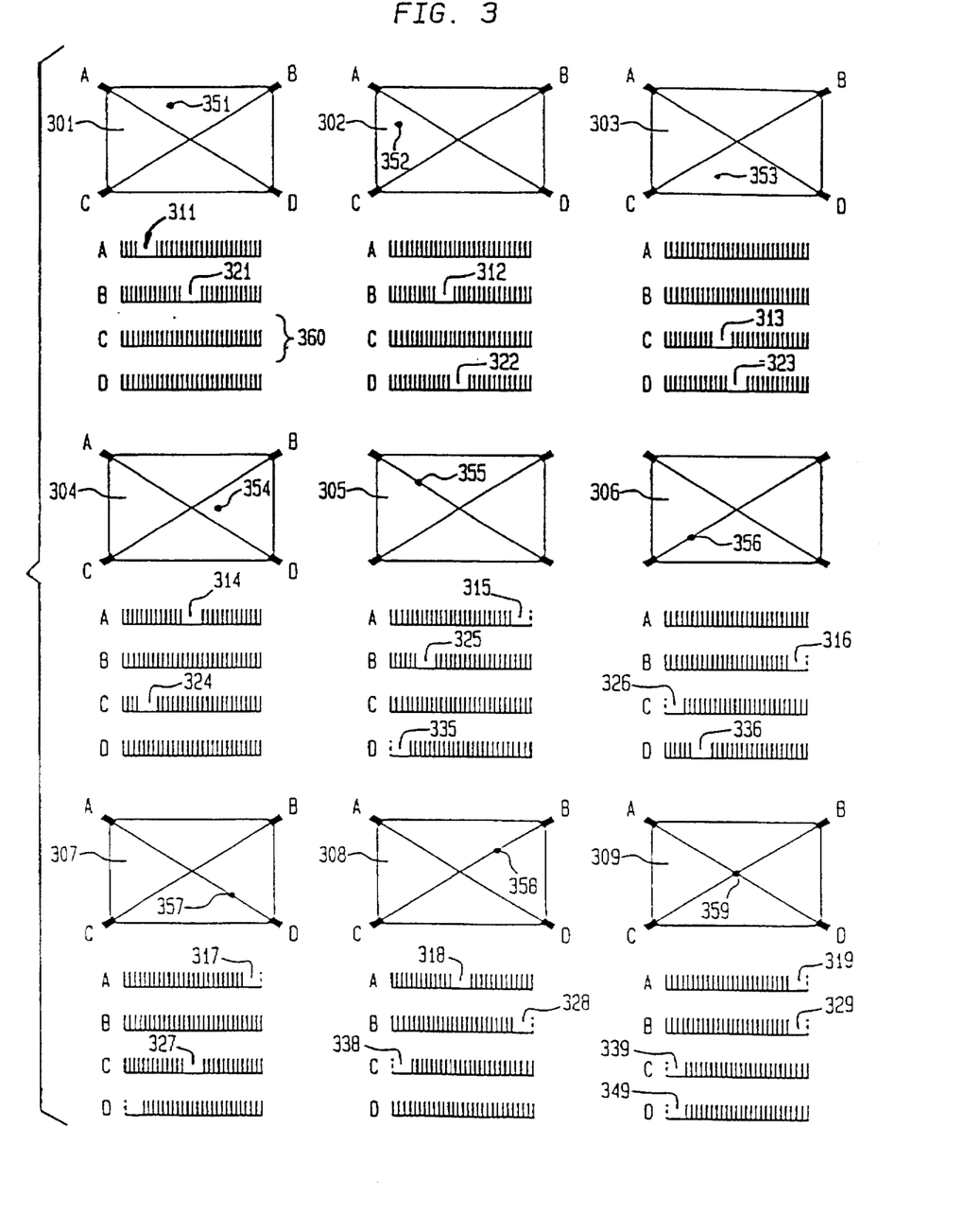
FIG. 3 shows the relation between the position of the pointer and the time sequences of the light pulses received by each of the four light detectors or alternatively the detector pulses generated by each of the light detectors.

As the position 250 of the pointer changes on the screen, the bright dashes 210 of the light patterns 204 detected at each detector 206 are different because the light patterns 204 are altered by the blocked lighted dashes 210, as shown in FIG. 3. FIG. 3 shows the pointer 110 at various positions (351–359) on the active display area 203. Below each screen 200 representation (301–309), there is a plot of detector signal received versus time for each detector 206 (A–D). The horizontal scale of each plot of the Figure represents time. The total length of the horizontal scale is the time of a complete raster scan (e.g. one vertical scan). For a VGA monitor, the time of a complete raster scan is about 14 msec. In the absence of a pointer 110, the light from the bright dashes 210 detected by the four light detectors A, B, C, and D span the entire time scale. With the presence of a pointer, some of the detector signals, representing the light from the bright dashes 210 of the light pattern 204, are missing. This is because the light from the bright dashes 210 to the respective detector 206 is blocked at that time. The time (in reference to the start of the vertical scan) that the light from the bright dashes 210 is blocked to the respective detector 206 is related to the location of the pointer 110. Therefore, depending on the actual location (351–359) of the pointer 110, the timing of the missing detector signals (311–319 and 321–329) are different, as shown by the nine plots of FIG. 3. The X-Y position and the size of the pointer can be determined by the timing of these detector signals (typically 360). If the pointer is located in one of the four regions, as shown in 301 though 304, the missing detector signals (311–314 and 321–324, respectively) occur to pairs of detectors 206 for each position (351–354) of the pointer 110. If the location of the pointer crosses one or more of the borders of the four regions, as shown in FIG. 3 (305–308), some of the missing detector signals will occur at the beginning or the end of the stream. Therefore, three or more detectors are affected. If the pointer is at the center of the screen, all four detectors are affected, as shown in FIG. 3 (309). The processing of the detector signals will be discussed in detail below.

Figure 4:
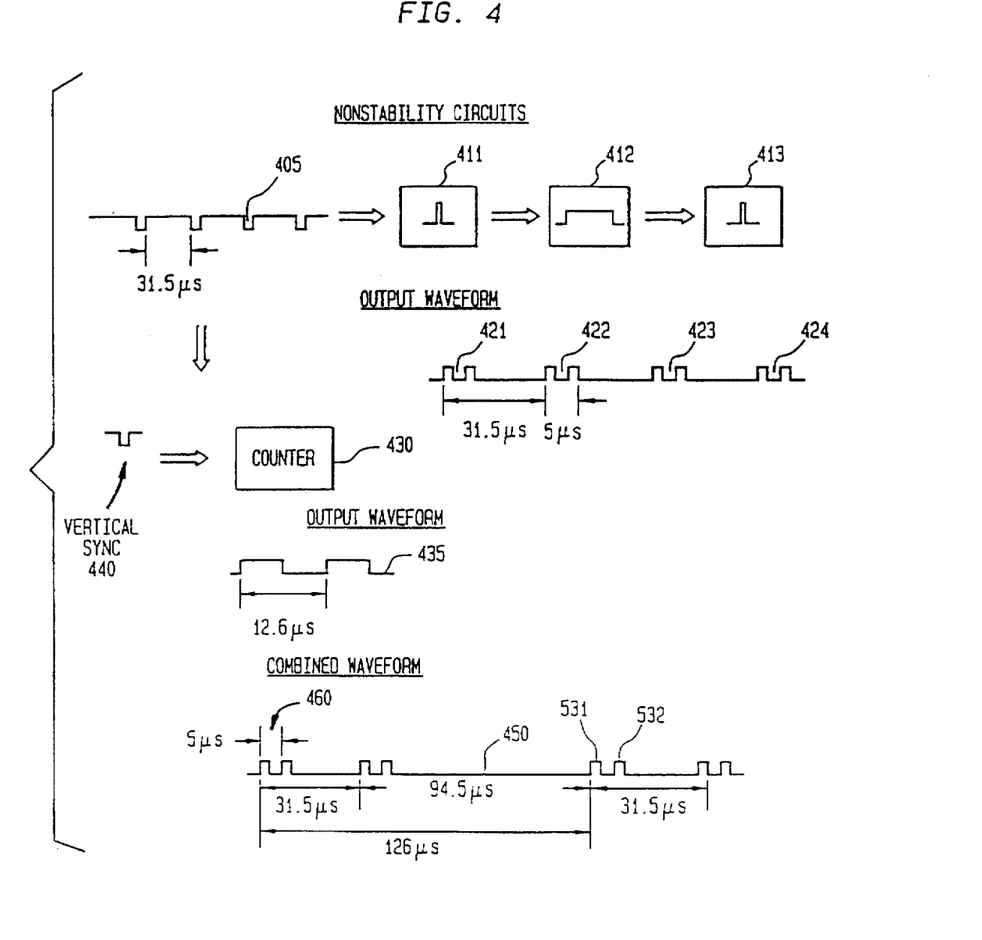
FIG. 4 is a schematic showing one preferred way of creating an electrical signal for making the light patterns of a unique frequency.

FIG. 4 shows the details of a timing diagram of the electrical pulses used for generating the light patterns 204 in the left 217 and right 219 margins of the CRT screen 200. In this particular embodiment, the pulses are generated by an electronic circuit. The origin of the signal is the horizontal synchronization (h-syn) pulse 405. On the one hand, the rising edge of the horizontal sync pulse 405 triggers three (411–413) nonstability circuits. The monstability circuits 411 and 412 each generate two consecutive pulses (421–424) of a width about 0.5 psec. The interval 460 between the two pulses, typically 531 and 532, is about 5 gsec, which is generated by monstability 412. The first pulse of each pair will be used (see below) to create the bright dash 210 at the end of a horizontal scan (e.g., the right side 219) while the second pulse of each pair will be used to create the bright dash 210 at the start of the next horizontal scan (e.g., the left side 217). (The 5 μsecond spacing 460 between the pulses in each pairs is used to permit the electron beam to fly back.)

On the other hand, the rising edge of the horizontal sync pulse 405 triggers a counter 430 to create a square wave 435 with a frequency which is an integer factor of the frequency of said horizontal sync pulse 405. To make the string of signals synchronous to the vertical scan, the vertical synchronization pulse 440 is used to clear the counter 430. The stream of consecutive pulses (421–424) is then modulated by the square wave 435 to create an alternating stream of double pulses 450. As shown, the fundamental period of this pulse sequence is 126 μsec, or a frequency of 7.88 kHz. This frequency is distinctly different from all the system and environmental signals. By applying the alternate double pulses 450 on a video amplifier, a composite video signal to generate the desired pattern of light from the bright dashes is created, as shown in FIG. 5.

Figure 5:
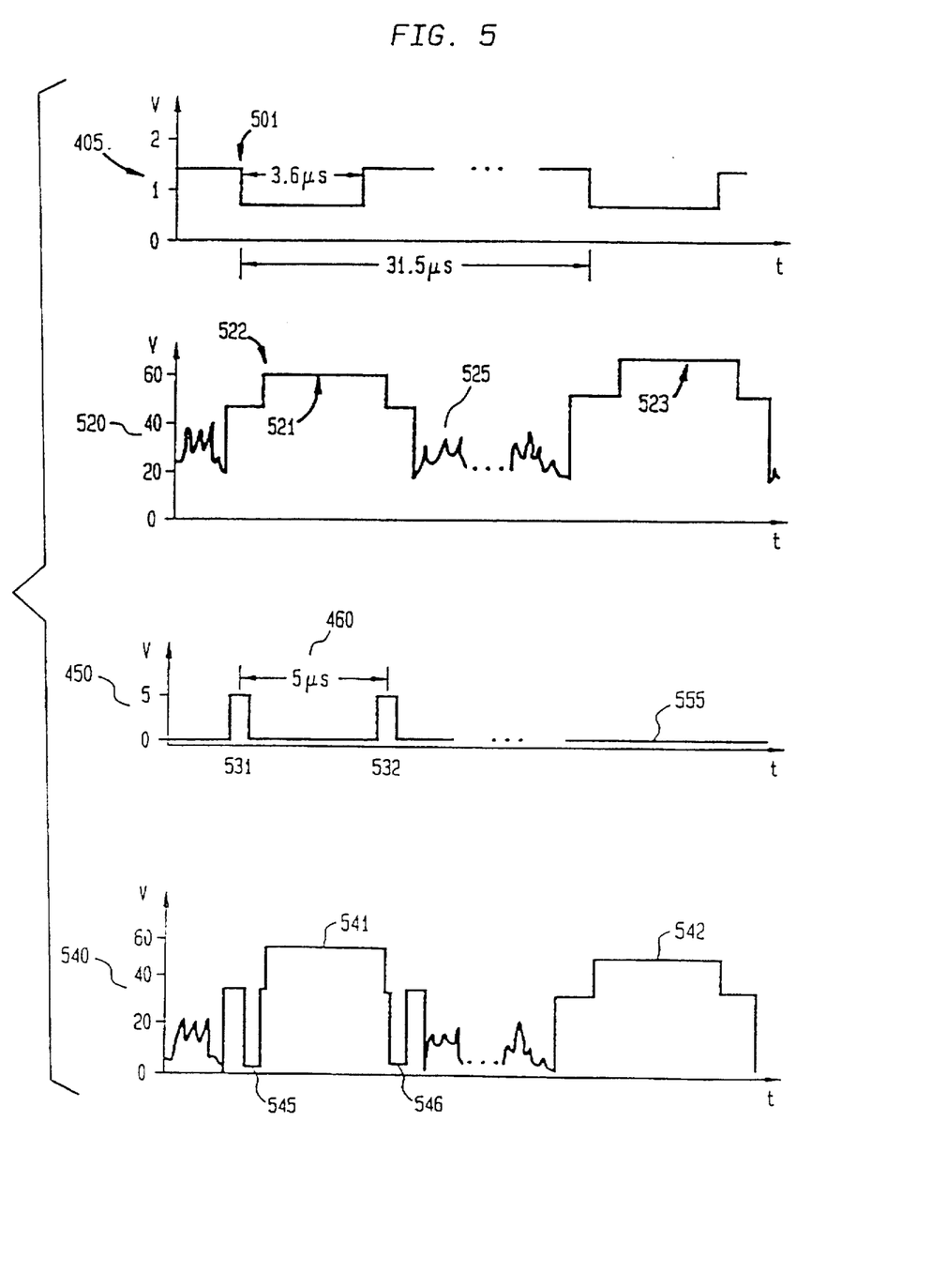
FIG. 5 shows voltage versus time graphs to illustrate how the signals shown in FIG. 4 are combined with inherent CRT signals to control the CRT electron beam to produce the light patterns.

As shown in FIG. 5, 405 is the vertical sync pulse of the CRT. The beginning edge 522 of the blanking pulse 521 of the original video signal at the output stage, is about one microsecond later than the beginning edge of the vertical sync pulse, 501. The blanking pulse 521 is generated by the CRT to suppress the electron beam from exciting the screen during each fly back. (Note that the video signals, typically 525, appear between the blanking pulses 521 and 523.) The timings of the monstability circuits 411 through 413 are adjusted to create two brightening pulses 531 and 532. These two pulses 531 and 532 are also represented as the pairs of pulses shown in FIG. 4. These two pulses 531 and 532 are coupled to the original video signal 520 to create a composite video signal 540. After being amplified and inverted, the two pulses 531 and 532 cause the composite video 540 to have two low-voltage pulses, one at its beginning 545 and one at its end 546. These low voltage pulses 545 and 546 generate two bright dashes in the borders 217 and 219 of the CRT screen, 204. Certain light edge points (dashes) can be selected to be lighted or not. To do this, the pulses 545 and 546 do not appear at every horizontal line. For example, to make a n=4, m=2 pattern, for every four lines, two lines will have these pulses 545 and 546, and two others do not. This edge point selection determines the light pattern frequency (in time and space) that carries the position signal (light blockage).

Figure 6:
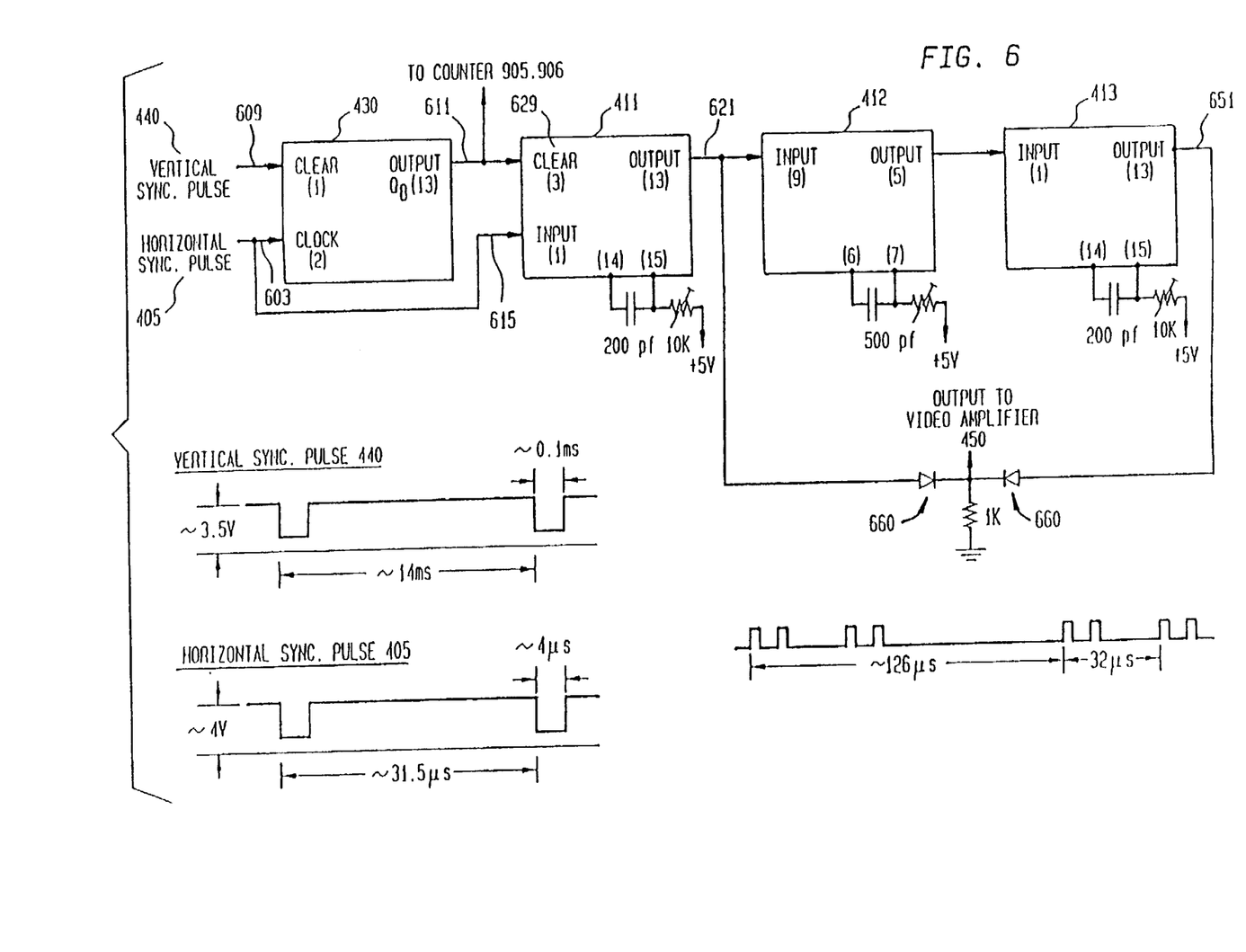
FIG. 6 is one preferred hardware embodiment for creating the the electric signal shown in FIG. 4.

FIG. 6 shows an example of an actual circuit for generating the stream of pulses 450. In this circuit, the beginning edge of the horizontal synchronization pulse 405 from the computer is connected to the clock input 603 of a counter 430, for example, MM54HC161. The CLEAR 609 input of the counter 430 is connected to the vertical synchronization pulse 440, also from the computer. The $Q_B$ output 611 is sent to the CLEAR input 629 of a series of monostable multivibrators (monstability) 411 through 413, for example, MM54HC221A. The horizontal synchronization pulse 405 is connected to the input 615 of the first monstability 411, which is then followed by two monstabilities 412 and 413. The output (621 and 651) from the first 411 and the third 413 monstabilities is fed to an OR circuit 660 and the OR circuit output 450 is used to make the composite signal 540, which is then sent to the input point of the video amplifier.

If the manufacturing process of the CRT is allowed to be altered, a preferred embodiment is to use a short-afterglow infrared phosphor at the left 217 and right 219 margins of the screen. The pulses 450 are sent to the input points of all three color video amplifiers. The silicon PIN photodiodes 206 used as detectors are most sensitive to near infrared light (about 800 nm). Using filtering materials, the visible light can be completely blocked. However, actual experimental showed that although the infrared phosphor may improve the performance, it is not an absolute necessity. Any existing CRTs can be used. The green and blue phosphor of ordinary CRTs (P22) has a shorter afterglow time (40 μsec) than the red phosphor (1 msec). It was found experimentally that the green and blue phosphorous of existing color CRT monitors are appropriate for the operation of the touchscreen device.

Alternative preferred embodiments of the circuit in FIG. 6 are possible, and are within the scope and contemplation of the invention.

For example, the three monstabilities can be replaced by a clock and a counter. The circuit can be made as one specially designed chip, without any capacitor and trim resistor.

Further, the light pattern can also be generated using software. Then, this input device can be retrofitted to existing monitors. However, in this embodiment, the light pattern occupies some areas at the left and right edges of the active screen 203. Thus, the existing application softwares may need to be modified, or new applications may need to be developed.

Figure 7A:
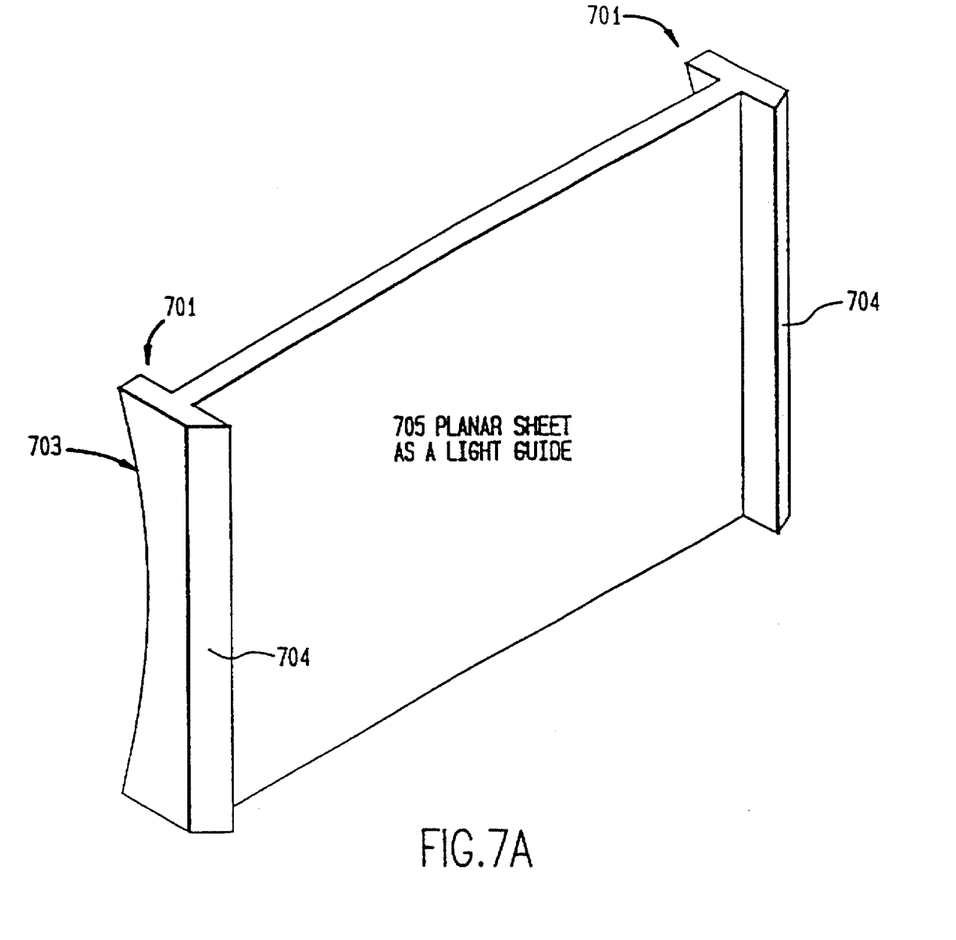
FIGS. 7A and 7B show a perspective view and a top projection view, respectively, of one preferred design of the light reflectors.
Figure 7B:
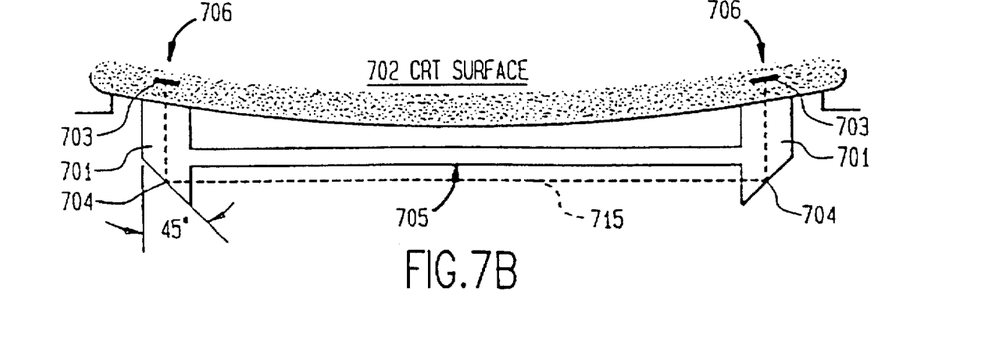

FIGS. 7A and 7B show, by a perspective and a top projection view, respectively, shows a preferred design of the plastic light reflector 700. It is made of plexiglass or any transparent plastics with an index of refraction larger than 1.4. The reflector 700 consists of two vertical bars 701 of about 5–10 mm thick. On the inner side 710, the shape 703 of the bar conforms with the CRT surface 702 at the location 706 of the light pattern. On the outer side 704, the bar 701 has a 45° surface. This surface can either be completely flat or slightly curved. A properly designed curved surface will improve the reflected light intensity but may be more difficult to manufacture. The intensity of reflected light increases with some curved surfaces because the curved surface acts a focusing mechanism. The inner surfaces 703 of the bars 701 are glued on the CRT surface with a transparent adhesive to eliminate two reflective surfaces. The light pattern 204 of the CRT is transmitted through the bars 701 and reflected by the 45° surface through total reflection to become roughly parallel to the CRT surface. As an option, the two vertical bars 701 are connected with a thin (3–5 mm) plastic or glass plate 705 which covers the active area 203 of the CRT. The mirror image of the light pattern from the surface of the plate 705 nearly doubles the light intensity at the light detector. Also, it gives a user a sense of touch. Because the thin plate 705 is vulnerable to scratching (for plastics) and breaking (for glass), this plate 705 can be made as a replaceable part. Because the plate 705 is not a essential functional element, the accuracy of its positioning is not critical, and it is simply a rectangular piece of thin plastic plate, so that the cost of its replacement is negligible.

In the actual manufacturing process, the plastic reflector may include some additional strengthening ribs, the mounting ports for the light detectors and the amplifiers. Those can be molded in a single manufacturing step.

An alternative embodiment of the reflectors is to use metal mirrors or metallized mirror surfaces.

Alternatively, as shown in FIG. 13, by engraving a series of non-reflective horizontal grooves 902 on the mirrors 904 (or plastic reflectors), the specific frequency can be created by using a uniform light bar (not shown) at the right margin and the left margin of the CRT screen. For example, by engraving 100 evenly spaced horizontal grooves on the mirror strip, for a VGA monitor, a signal frequency of about 7.1 kHz is generated.

Figure 8:
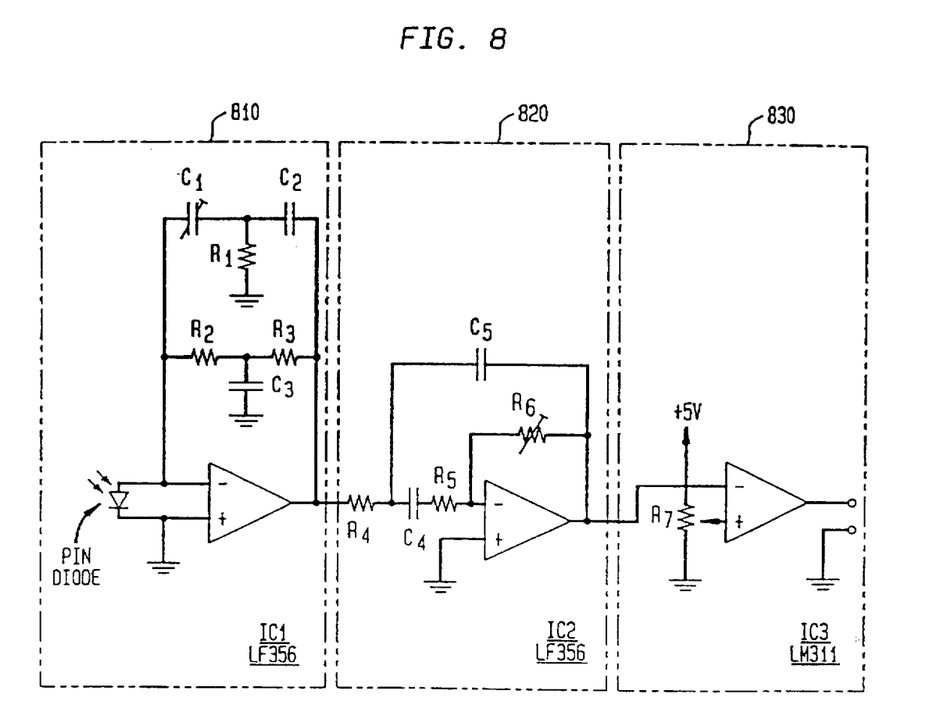
FIG. 8 is a typical circuit for the band-pass filter and amplifier to filter the signal from the light detectors.

FIG. 8 shows an example of the analog amplifier 800. An important function of the amplifier 800 is to pick up the useful signal and to reject various kinds of noise. One large noise common to these systems is the magnetic field of the horizontal deflection coil. For VGA monitors, this frequency is 31.5 kHz. Other noise is the room light and the magnetic field of the power line, which contains the fundamental and many overtones of the 60 Hz source. By choosing a light pulse frequency of the light pattern 204 from the bright dashes 210 between these two noises and using a band pass filter 810, the true signal of the light pattern 204 can be picked up. For VGA monitors, an example of the chosen frequency (in time) is 7.88 kHz, ¼ of the horizontal scan frequency. After amplification 820, the analog signal is sent to a comparator 830, to compare with an adjustable fixed voltage. The result is a series of TTL pulses (either 0V or +5V) representing the light pattern 204.

Alternative methods for such band-pass filtering comprise switch-capacitor filters, and phase-sensitive detection methods such as used in lock-in amplifiers. These methods can be used for multiple-frequency detection, because the frequency can be programmed or changed by changing the reference frequency.

Figure 9:
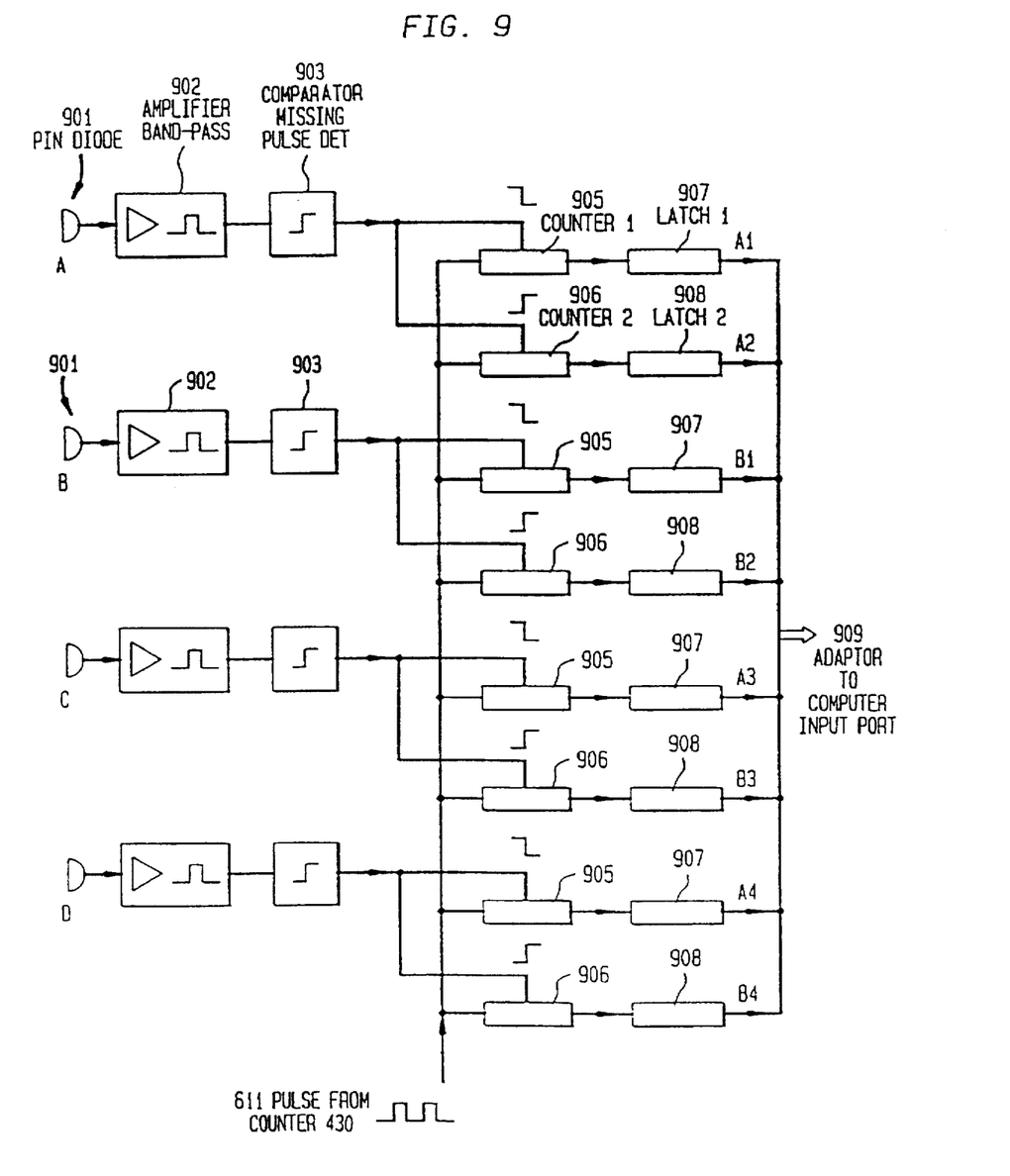
FIG. 9 is a schematic of a preferred circuit to detect the timing of the light blocked by the pointer.
Figure 10:
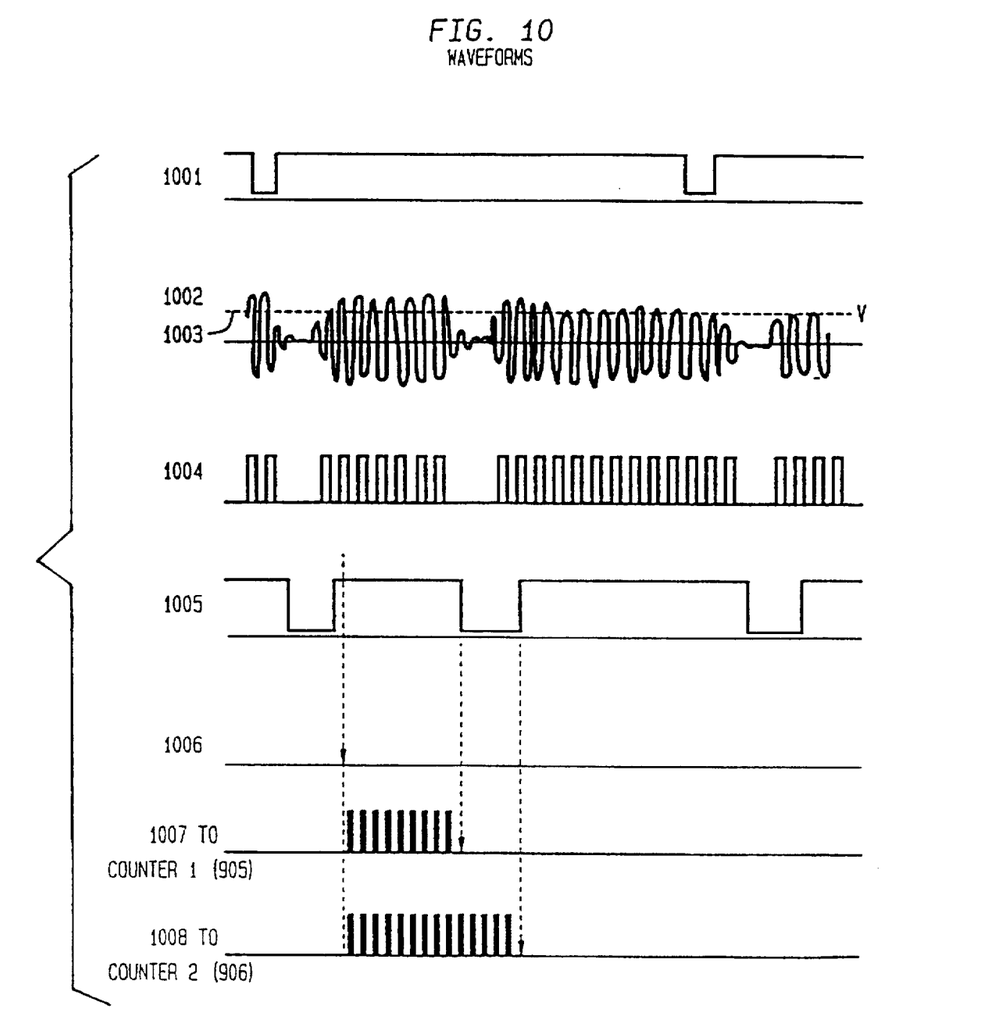
FIG. 10 is the typical waveform found after the analog amplifiers.

FIG. 9 is a schematic of the digital circuit which converts the output of the comparator 830 to a stream of digital signals which the computer can receive through the serial port (or the parallel port). FIG. 10 shows the corresponding waveforms. The vertical synchronization signal, 1001, is used for the reference of the counters, 905 and 906. The output from counter 605 is the clock pulse for counters 905 and 906. The signal from the light detectors, after amplification and filtering, 1002, is sent to a comparator/missing pulse detector 903 with level 1003. The output of the comparator portion (not shown) of item 903, 1004, is sent to a missing pulse detector portion (not shown) of item 903, which generates a waveform 1005. The counters 905 and 906 are started with a delayed signal from the vertical sync pulse 1001. The timing of it is after the starting of the pulse sequence 1004. The falling edge of the output of the missing pulse detector, 1005, is used to terminate counter 905. The rising edge of 1005 is used to terminate counter 906. Therefore, the content of counter 905 reflects the starting position of the pointer, and the content of counter 906 reflects the ending position of the pointer. The contents of the counters are then transmitted to the computer via the series port or parallel port. The digital circuit can be made either from a programmable logic circuit or as an application specific integrated circuit.

Figure 11:
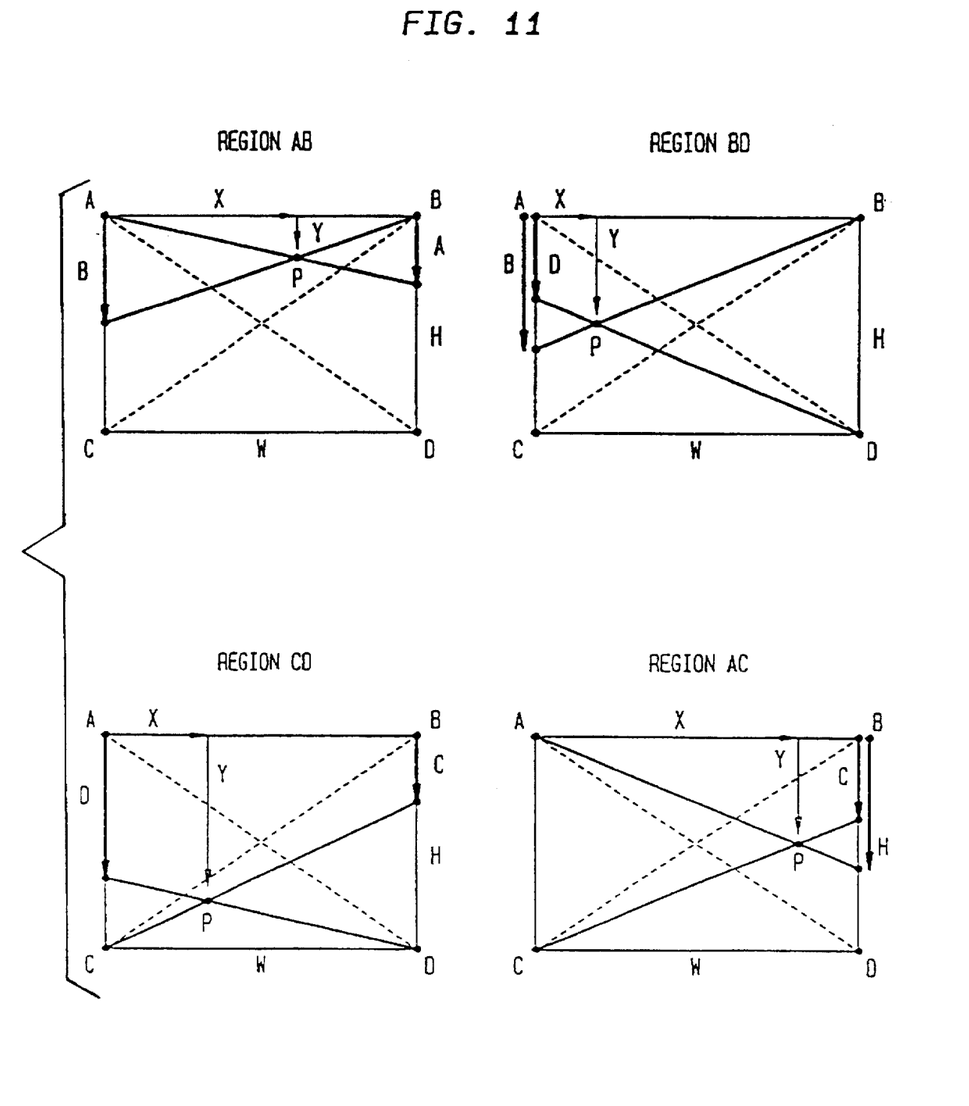
FIG. 11 shows the calculation of the X-Y coordinates of the pointer from the locations of the obstruction of light.

The X-Y coordinates of the pointer can be calculated from the start points and end points of the pulse sequences, that is, the contents of the counter as sent to the computer. The calculation procedure is shown in FIG. 11. The quantities H and W are the height and width of the rectangle spanned by the four light detectors, respectively. The origin of the coordinate system is the left upper corner of the rectangle. In region AB, the light detectors A and B are intercepted. The coordinates of the pointer are $$X = \frac{BW}{A+B},$$

and $$Y = \frac{AB}{A+B}.$$

In region CD, the light detectors C and D are intercepted. The coordinates of the pointer are $$X = \frac{W(H-D)}{2H-C-D},$$

and $$Y = \frac{H^2 - CD}{2H - C - D}.$$

In region BD, the light detectors B and D are intercepted. The coordinates (if the pointer are $$X = \frac{W(B-D)}{H+B-D},$$

and $$Y = \frac{HB}{H+B-D}.$$

In region AC, the light detectors A and C are intercepted. The coordinates of the are $$X = \frac{WH}{H+A-C},$$

and $$Y = \frac{HA}{H+A-C}.$$

The resolution on the entire region is not uniform. The maximum resolution is in around the center of the screen. For a 13 inch VGA monitor, the horizontal scanning frequency is 31.5 kHz. According to the ratio between the horizontal frequency and the signal frequency, the maximum resolution is

| Ratio | Signal Frequency (kHz) | Resolution (mm) (lines) |
|---|---|---|
| 2 | 15.75 | 0.45 (480) |
| 3 | 11.8 | 0.675 (320) |
| 4 | 7.88 | 0.9 (240) |
| 6 | 5.9 | 1.35 (160) |
| 8 | 3.94 | 1.8 (120) |

Figure 12:
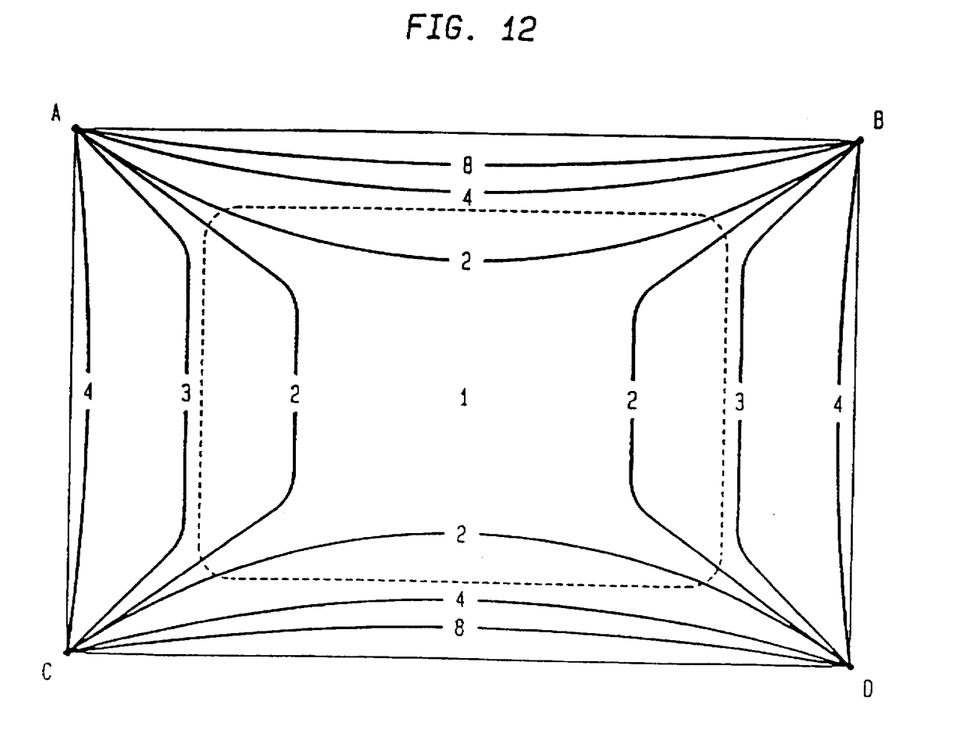
FIG. 12 is the resolution distribution on the CRT screen.

Near the borders, the resolution is worsened, as shown in FIG. 12. In a preferred embodiment, to achieve a relatively uniform resolution, the light detectors must be placed at four points substantially outside the active screen. Such a condition means that the height of the strips of the light pattern should be greater than the height of the active screen. Actually, by creating the light pattern with a circuit, as shown in FIGS. 4 through 6, the height of the light pattern strip is naturally greater than the height of the active screen 203. The optics requires that the horizontal positions of the light detectors be outside the patterns by at least a distance from the screen surface to the center of the reflective surface. Therefore, the condition is naturally satisfied. Hence, the low-resolution regions of the input device near the borders of the screen are naturally avoided.

One skilled in the art given this disclosure could develop alternative equivalent embodiments that are within the scope and contemplation of the present invention. For example, since the resolution (of pointer 110 detection) is determined by the density of light sources (dashes) in the light pattern, the spatial frequency 260 of the dashes 210 can be increased to increase the resolution.

Therefore a much improved accuracy can be gained by increasing the density of light sources (dashes 210) in the light pattern 204. Note that the light pattern 204 spatial frequency 260 and therefore the apparatus positioning accuracy, is not limited by the physical size of photodiode light sources. In addition, the light intensity can also be varied by changing the spatial frequency of the light pattern 204. This can be done by choosing a spatial pattern with lighted dashes (edge points) in groups of more than one to increase the intensity of the light reflected at the location of the dash grouping.

The four photodetectors and the associated circuits are the only significant additions to the manufacturing cost of the monitor with the touchscreen function. Therefore, the present touch screen input apparatus can be manufactured with a much lower incremental cost than prior art touchscreen input devices. In addition, the present invention has no mechanical moving parts that are subject to wear.

We claim:

1. A touch screen input apparatus used to determine the position of a pointer on a computer screen, comprising:
    a computer interface screen having a screen surface comprising a main area extending between a pair of parallel borders, a filet border adjacent a first of said pair of borders and a second border area adjacent a second of said pair of borders;

a raster scanner means forming the screen surface along a plurality of rows from the first to the second of said pair of borders at a raster frequency, having means for indexing after a cycle of the raster frequency from one of said rows to another of said rows across the screen in a second direction approximately perpendicular to the first direction, so as to cycle through said plurality of rows at a scanning frequency and means for illuminating within a cycle of said scanning frequency a first and a second plurality of edge points within said first border area and said second border area, respectively, said first and second plurality of edge points being arranged in a periodic spacing in said second direction, and said spacing being so that the inverse of the time period from illuminating one of said first and second plurality of edge points to a next of said first and second plurality of edge points, respectively, is equal to a predetermined pattern frequency which is greater than said scanning frequency and less than said raster frequency first and second light reflective surfaces adjacent to the first and second borders, respectively, the first reflective surface reflecting the light luminescing from said first plurality edge points across the screen surface in a direction toward the second border and the second reflective surface reflecting the light luminescing from said second plurality edge points across the screen to the first border;

means for receiving the light luminescing from said first plurality of edge points reflected by said first reflective surface, said means having a spatially separated first and second light receiving means proximal to said second border, and for generating a first and second detection signal in response;

means for receiving the light luminescing from said second plurality of edge points reflected by said second reflective surface, said means having a spatially separated third and fourth light receiving means proximal to said first border, and for generating a third and fourth detection signal in response;

bandpass filter means for receiving said first, second, third, and fourth detection signals, substantially suppressing frequencies other than said pattern frequency, and generating a filtered first, a filtered second, a filtered third, and a filtered fourth detection signal, respectively, in response;

and means for determining a position of an object blocking one or more of a light reflected by said second reflective surface from reaching the first and second light receiving means and a light reflected by said first reflective means from reaching said third and fourth receiving means based on said filtered first, filtered second, filtered third, and filtered fourth detection signals.

2. A touch screen input apparatus according to claim 1, where each of said first and second light reflective surface further comprises a bar of transparent plastic, the bar having an inner side and a reflective side, the inner side being opposite the reflective side, the inner side having the shape of the screen and being in proximity with a screen surface over corresponding ones of said first and second plurality of edge points, and the reflective side being disposed at an angle to light from said corresponding edge points passing through the bar, so that the light is reflected across the screen surface.

3. A touch screen input apparatus, as in claim 2, where each light reflective surface bar is connected together by a transparent plate, a first edge of the plate connected to the first reflective surface and a second edge of the plate connected to the second reflective surface.

4. A touch screen input apparatus, as in claim 3, where the plate acts as a mirrored surface to increase the intensity of the reflected light.

5. A touch screen input apparatus used to determine the position of a pointer on a computer screen, comprising:

a computer interface screen having a screen surface comprising a main area extending in first direction between a pair of parallel borders extending in a second direction, a first border area extending along a first of said pair of borders and a second border area extending along a second of said pair of borders;

a raster scanner means for scanning the screen surface in the first direction at a raster frequency, and having means for means for illuminating a first substantially continuous vertical bar within said first border area and illuminating a second substantially continuous vertical bar within said second border area, said illuminating being repeated at a scanning frequency, first and second periodically reflective surfaces adjacent to the first and second borders, respectively, the first periodically reflective surface reflecting, in a spatially periodic manner, with a periodicity in said second direction, the light luminescing from said first substantially continuous vertical bar across the screen surface in a direction toward the second border, the second periodically reflective surface reflecting, in a spatially periodic manner, with said periodicity in said second direction, the light luminescing from said second substantially continuous vertical bar across the screen surface in a direction toward the first border, means for receiving the light luminescing from said first substantially continuous vertical bar periodically reflected by said first periodic reflective surface, said means having a spatially separated first and second light receiving means proximal to said second border, and for generating a first and second detection signal in response;

means for receiving the light luminescing from said second substantially continuous vertical bar periodically reflected by said second periodic reflective surface, said means having a spatially separated third and second fourth receiving means proximal to said first border, and for generating a third and fourth detection signal in response;

bandpass filter means for receiving said first, second, third, and fourth detection signals, substantially suppressing frequencies other than a predetermined pattern frequency, said pattern frequency being proportional to the scanning frequency divided by said periodicity, and generating a filtered first, a filtered second, a filtered third, and a filtered fourth detection signal, respectively, in response; and means for determining a position of an object blocking one or more of a light reflected by said second periodic reflective surface from reaching the first and second light receiving means and a light reflected by said first periodic reflective means from reaching said third and fourth receiving means based on said filtered first, filtered second, filtered third, and filtered fourth detection signals.

6. A touch screen apparatus according to claim 5 wherein said first and second periodically reflective surfaces each comprise a surface with grooves extending in said first direction and periodically spaced in said second direction with a reflective surface between said grooves.

* * * * *